US011990103B2

(12) United States Patent
Watanabe

(10) Patent No.: US 11,990,103 B2
(45) Date of Patent: May 21, 2024

(54) INTERFACE CIRCUIT, SOURCE DRIVER, AND DISPLAY DEVICE

(71) Applicant: LAPIS Technology Co., Ltd., Yokohama (JP)

(72) Inventor: Yukinobu Watanabe, Yokohama (JP)

(73) Assignee: LAPIS TECHNOLOGY CO., LTD., Yokohama (JP)

( * ) Notice: Subject to any disclaimer, the term of this patent is extended or adjusted under 35 U.S.C. 154(b) by 0 days.

(21) Appl. No.: 18/187,460

(22) Filed: Mar. 21, 2023

(65) Prior Publication Data

US 2023/0230557 A1 Jul. 20, 2023

Related U.S. Application Data

(63) Continuation-in-part of application No. 17/529,471, filed on Nov. 18, 2021, now Pat. No. 11,636,820.

(30) Foreign Application Priority Data

Nov. 30, 2020 (JP) ................................ 2020-198152

(51) Int. Cl.
*G09G 3/36* (2006.01)
*G09G 3/00* (2006.01)
*G09G 3/20* (2006.01)

(52) U.S. Cl.
CPC ........... *G09G 3/3685* (2013.01); *G09G 3/006* (2013.01); *G09G 3/2096* (2013.01); *G09G 3/3688* (2013.01); *G09G 3/3696* (2013.01); *G09G 2310/08* (2013.01); *G09G 2330/12* (2013.01); *G09G 2370/08* (2013.01); *G09G 2370/14* (2013.01)

(58) Field of Classification Search
CPC ............. G09G 3/3688; G09G 2330/12; G09G 2370/14
See application file for complete search history.

(56) References Cited

U.S. PATENT DOCUMENTS

| | | | | |
|---|---|---|---|---|
| 6,023,774 A * | 2/2000 | Minagawa | G06F 11/1443 | 370/242 |
| 10,388,209 B2 | 8/2019 | Kadota | | |
| 2018/0090056 A1 | 3/2018 | Kadota | | |

FOREIGN PATENT DOCUMENTS

| | | |
|---|---|---|
| JP | 2018-054830 A | 4/2018 |

* cited by examiner

*Primary Examiner* — Gene W Lee
(74) *Attorney, Agent, or Firm* — Rabin & Berdo, P.C.

(57) ABSTRACT

An interface circuit comprises a timing signal generating unit that generates a timing signal indicating a timing to switch between a data input period and a non-input period, a plurality of driver error detection circuits that detects an error in source drivers, a selector circuit that selects one of the driver error detection circuits in the non-input period and that outputs a driver error detection signal indicating an error detection result, an input error detection circuit that detects an input error of a data signal and outputs an input error detection signal indicating the result, an OR circuit that outputs an OR of the driver error detection signal and the input error detection signal, and a signal output unit connected to an output part of the OR circuit.

2 Claims, 10 Drawing Sheets

INTERFACE CIRCUIT, SOURCE DRIVER, AND DISPLAY DEVICE

CROSS REFERENCE TO RELATED APPLICATION

This application is a continuation-in-part of U.S. application Ser. No. 17/529,471, filed on Nov. 18, 2021, which is based upon and claims the benefit of priority of the prior Japanese Patent Application No. 2020-198152, filed on Nov. 30, 2020, the entire contents of which are incorporated herein by reference.

TECHNICAL FIELD

The present invention relates to an interface circuit, a source driver, and a display device.

BACKGROUND ART

In liquid crystal display devices, image signals are sent from a display control device such as a timing controller to a source driver that drives a liquid crystal panel. Examples of the image signal transmission methods include the mini-LVDS (mini-low voltage differential signaling) method. The mini-LVDS method is a type of the differential signaling method that transmits an image signal as a differential signal, and transmits an image signal up to 8-bit with a pair (a set of two) of signal wires.

Liquid crystal display devices are equipped with an error detection circuit for detecting an error in the source driver or the like. In some cases, the source driver is equipped with a plurality of error detection circuits for detecting various types of errors such as abnormal temperatures, abnormal voltage values, and abnormal polarity inversion. The detection results of those error detection circuits are outputted by selecting each of the error detection circuits at a different timing and outputting the detection result of the selected circuit in a time-division manner. In this process, an interface circuit in the source driver receives a selection signal from a display control device such as a timing controller, and selects an error detection circuit in accordance with this signal. As such an interface circuit, proposed is an interface circuit that is capable of transmitting error detection results of the error detection circuits from the source driver to TCON (timing controller) using the mini-LVDS method, for example (see Japanese Patent Application Laid-open Publication No. 2018-54830, for example).

This interface circuit includes an input data control circuit that receives a clock signal and a plurality of input data signals supplied from TCON, for example, and a control mode signal input detection circuit that generates a control signal input mode signal for setting a timing of the start of data input in response to the supply of an LS signal that indicates the starting point of each section of the display data. The interface circuit also includes a signal line for transmitting a start pulse signal that is inputted and outputted between source drivers when a plurality of source drivers are cascade-connected. Besides those circuits, a plurality of error detection circuits and an error detection selector circuit that selectively outputs detection results of the plurality of error detection circuits using NAND output of the differential input signal of the mini-LVDS interface as a selection signal are included. The output of the error detection selector circuit has an open drain configuration to output an FD_OUT signal, and is pulled up by a power source outside of a chip. For example, in the control signal input mode, a control mode signal of the H-level is supplied, and the detection results of the plurality of error detection circuits are successively outputted as FD_OUT signals.

SUMMARY OF THE INVENTION

Problems to be Solved by the Invention

In the interface circuit described above, it is possible to detect line breaking of data supply lines connected to TCON (that is, an open fault) by controlling the circuit to output an L-level FD_OUT signal when all of the input data signals from TCON are at the H level, for example.

However, the interface circuit having such a configuration had a problem of not being able to detect an open fault if the data supply lines of a plurality of data input signals are all fixed to the H level due to line breaking.

Furthermore, there was also a problem of not being able to detect an open fault if a plurality of source drivers are cascade-connected. For example, in a case where the first to third drivers are cascade-connected to each other, and the first driver and the second driver are normally operating while the third driver has line breaking (is open), when the input data signals are all set to the H level to detect line breaking, TCON receives the L-level signal and determines that there is no line breaking because the first driver and the second driver output an L-level signal. Thus, even if one of the plurality of source drivers has line breaking, TCON cannot detect this fault.

In order to solve those problems, an object of the present invention is to provide an interface circuit that can detect line breaking of data supply lines even when a plurality of source drivers are cascade-connected to each other.

An interface circuit of the present invention is an interface circuit provided in a source driver that drives a display device, the interface circuit receiving a plurality of data signals and supplying the plurality of data signals to a data latch circuit of the source driver, the interface circuit including: a timing signal generating circuit that receives a clock signal input and that generates a timing signal indicating a timing to switch between a data input period in which the plurality of data signals are supplied to the data latch circuit and a non-input period in which the supply of the plurality of data signals is stopped, based on at least one of the plurality of data signals and the clock signal; a data control circuit that controls the supply of the plurality of data signals to the data latch circuit based on the timing signal; a plurality of driver error detection circuits that detect an error in the source driver; a selector circuit that selects one of the plurality of driver error detection circuits based on the plurality of data signals during the non-input period, and outputs a driver error detection signal indicating a detection result of the selected driver error detection circuit at a timing corresponding to the timing signal and the clock signal; an input error detection circuit that detects a data input error of the plurality of data signals and outputs an input error detection signal indicating a detection result; an OR circuit that outputs an OR signal indicating a logical disjunction of the driver error detection signal and the input error detection signal; and a signal output unit that includes a first conductivity type MOS transistor having a gate terminal connected to an output part of the OR circuit and a source terminal connected to a potential, and a signal output line connected to a drain terminal of the MOS transistor.

A source driver of the present invention is a source driver that drives a display device based on a plurality of data signals, including: an interface circuit that receives a clock signal and the plurality of data signals and that outputs the plurality of data signals in accordance with a clock timing of the clock signal; a latch circuit that receives the plurality of data signals outputted from the interface circuit and that outputs the data signals in a successive order corresponding to pixel columns of the display device in a scanning line direction; a gradation voltage generating unit that generates a plurality of gradation voltages based on the data signals outputted from the latch circuit; and an output unit that selects one gradation voltage corresponding to a luminance level indicated by the data signal, out of the plurality of gradation voltages, and that outputs a signal having that one gradation voltage as a driving signal of the display device, wherein the interface circuit includes: a timing signal generating circuit that receives the clock signal input and that generates a timing signal indicating a timing to switch between a data input period in which the plurality of data signals are supplied to a data latch circuit and a non-input period in which the supply of the plurality of data signals is stopped, based on at least one of the plurality of data signals and the clock signal; a data control circuit that controls the supply of the plurality of data signals to the data latch circuit based on the timing signal; a plurality of driver error detection circuits that detect an error in the source driver; a selector circuit that selects one of the plurality of driver error detection circuits based on the plurality of data signals during the non-input period, and outputs a driver error detection signal indicating a detection result of the selected driver error detection circuit at a timing corresponding to the timing signal and the clock signal; an input error detection circuit that detects a data input error of the plurality of data signals and outputs an input error detection signal indicating a detection result; an OR circuit that outputs an OR signal indicating a logical disjunction of the driver error detection signal and the input error detection signal; and a signal output unit that includes a first conductivity type MOS transistor having a gate terminal connected to an output part of the OR circuit and a source terminal connected to a potential, and a signal output line connected to a drain terminal of the MOS transistor.

A display device of the present invention includes: a display panel having a plurality of data lines and scanning lines, and pixel switches and pixel units disposed at respective intersections of the plurality of data lines and the plurality of scanning lines; a display control unit that outputs a clock signal and a plurality of data signals; and a plurality of source drivers that are arranged along an extending direction of the scanning lines and that each drive the display device based on the plurality of data signals, wherein each of the plurality of source drivers includes: an interface circuit that receives the clock signal and the plurality of data signals and that outputs the plurality of data signals in accordance with a clock timing of the clock signal; a latch circuit that receives the plurality of data signals outputted from the interface circuit and that outputs the data signals in a successive order corresponding to pixel columns of the display device in a scanning line direction; a gradation voltage generating unit that generates a plurality of gradation voltages based on the data signals outputted from the latch circuit; and an output unit that selects one gradation voltage corresponding to a luminance level indicated by the data signal, out of the plurality of gradation voltages, and that outputs a signal having that one gradation voltage as a driving signal of the display device, wherein the interface circuit includes: a timing signal generating circuit that receives the clock signal input and that generates a timing signal indicating a timing to switch between a data input period in which the plurality of data signals are supplied to a data latch circuit and a non-input period in which the supply of the plurality of data signals is stopped, based on at least one of the plurality of data signals and the clock signal; a data control circuit that controls the supply of the plurality of data signals to the data latch circuit based on the timing signal; a plurality of driver error detection circuits that detect an error in the source driver; a selector circuit that selects one of the plurality of driver error detection circuits based on the plurality of data signals during the non-input period, and outputs a driver error detection signal indicating a detection result of the selected driver error detection circuit at a timing corresponding to the timing signal and the clock signal; an input error detection circuit that detects a data input error of the plurality of data signals and outputs an input error detection signal indicating a detection result; an OR circuit that outputs an OR signal indicating a logical disjunction of the driver error detection signal and the input error detection signal; and a signal output unit that includes a first conductivity type MOS transistor having a gate terminal connected to an output part of the OR circuit and a source terminal connected to a potential, and a signal output line connected to a drain terminal of the MOS transistor.

According to an interface circuit of the present invention, it is possible to detect line breaking of data supply lines even when a plurality of source drivers are cascade-connected.

DETAILED DESCRIPTION OF THE EMBODIMENTS

Figure 1:
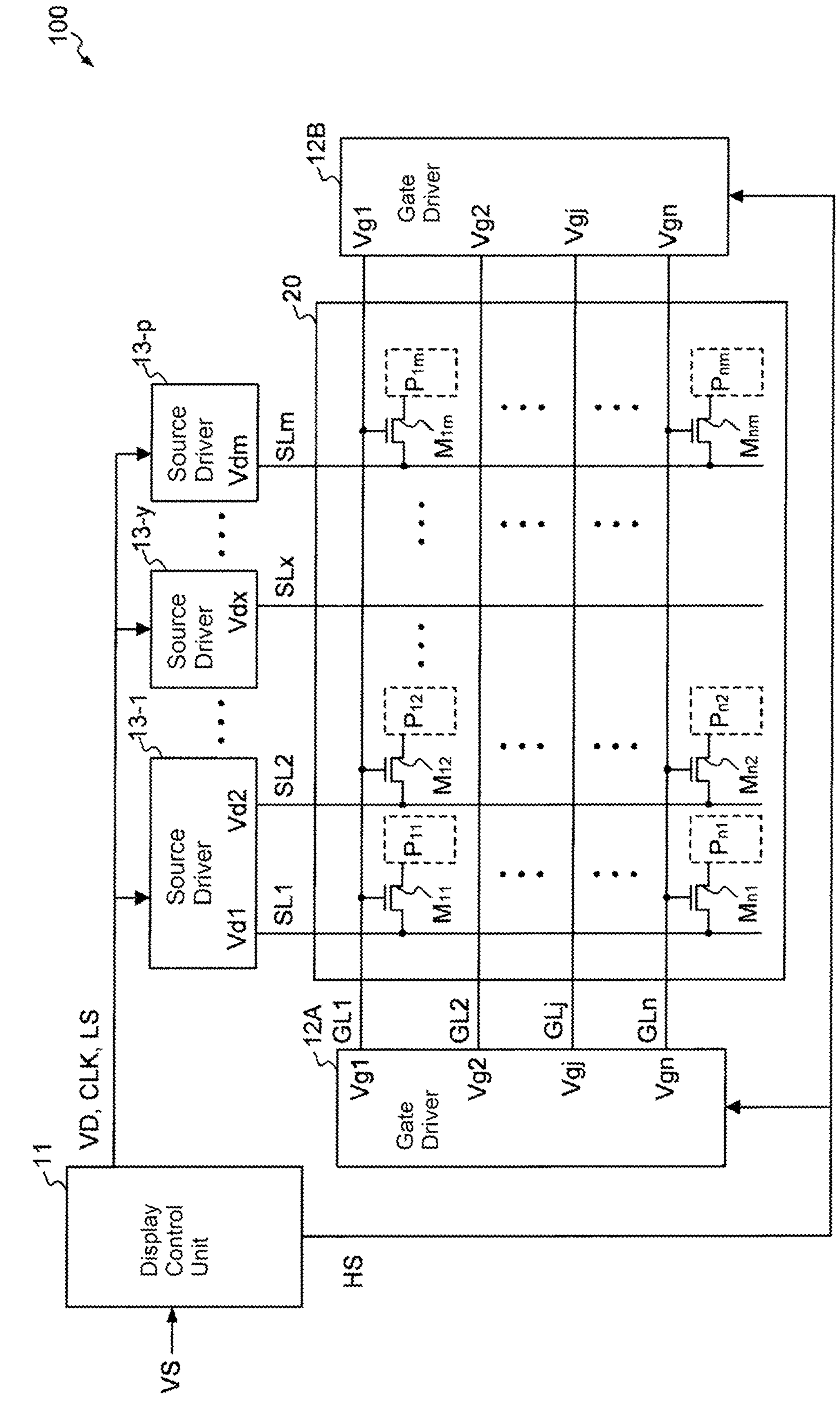
FIG. 1 is a block diagram illustrating a configuration of a display device 100 of the present invention.

Below, an embodiment of the present invention will be explained with reference to figures. In the description of the embodiment below and appended diagrams, the same reference characters are given to parts that are substantially the same as each other or equivalent to each other.

FIG. 1 is a block diagram illustrating a configuration of a display device 100 including an interface circuit of the present invention. The display device 100 is an active-matrix liquid crystal display device. The display device 100 includes a display control unit 11, gate drivers 12A and 12B, source drivers 13-1 to 13-*p*, and a displaying device 20.

The display control unit 11 is a display control device constituted of a timing controller (TCON) or the like, for example, and controls a display timing of an image in a liquid crystal display panel by supplying a video data signal VD, a clock signal CLK, and a line start signal LS to the source drivers 13-1 to 13-*p*. The display control unit 11 transmits the video data signal VD by a differential signal method such as the mini-LVDS (mini-low voltage differential signaling) method, for example.

The display control unit 11 generates a series of pixel data pieces PD that represent luminance levels of respective pixels with a 6-bit luminance gradation, for example, based on the input video signal VS, and supplies the video data signal VD including this series of pixel data pieces PD to the source drivers 13. In the description below, an example will be explained where the video data signal VD is constituted of input data signals LV0, LV1 and LV2. The input data signals LV0, LV1 and LV2 are signals that change their respective signal levels between the logical level 1 and the logical level 0 in accordance with the clock cycle of the clock signal CLK, and are differential signals transmitted by the mini-LVDS method. In the description below, the logical level 1 will be referred to as the H level (high level), and the logical level 0 will be referred to as the L level (low level).

The display control unit 11 supplies the clock signal CLK and the line start signal LS that indicates a starting position (top position, for example) of each section in the series of n-number of pixel data pieces PD corresponding to the respective horizontal scanning lines to the source drivers 13-1 to 13-*p*. Furthermore, the display control unit 11 detects a horizontal synchronization signal HS from the input video signal VS, and supplies the signal HS to the gate drivers 12A and 12B.

The display control unit 11 changes the signal levels of the respective input data signals LV0, LV1, and LV2 with a prescribed pattern, in order to determine whether there is a fault such as line breaking in the data supply lines connected to the source drivers 13. In this embodiment, the display control unit 11 changes the signal levels of the respective input data signals LV0, Lv1, and LV2 in the pattern of "H→H→L" at a prescribed timing outside of the data input period.

The displaying device 20 is an image display device constituted of a liquid crystal display panel or an organic EL (electro-luminescence) panel, for example. In the displaying device 20, an n-number (n is a natural number of 2 or greater) of horizontal scanning lines GL1 to GLn that extend in the horizontal direction of the two-dimensional screen, and an m-number (m is a natural number of 2 or greater) of source lines SL1 to SLm that extend in the vertical direction of the two-dimensional screen are formed. At the respective intersections of the horizontal scanning lines and the source lines, pixel units P11 to Pnm and pixel switches M11 to Mnm are formed, each constituting a display cell for a pixel.

The gate drivers 12A and 12B supply the gate signals Vg1 to Vgn to the gate lines GL1 to GLn based on the synchronization timing of the horizontal synchronization signal HS supplied from the display control unit 11. By the gate signals Vg1 to Vgn, pixel units P11 to Pnm are selected for each pixel row. Then the gradation voltage signals Vd1 to Vdm are supplied from the source drivers 13-1 to 13-*p* to the selected pixel units, and the gradation voltage signals Vd1 to Vdm are written in the pixel electrodes.

The source drivers 13-1 to 13-*p* are each provided for a group of source lines, obtained by dividing the source lines SL1 to SLm into a prescribed number of groups. The number of source lines driven by one source driver corresponds to the number of output ch of the source driver. For example, in a case where each source driver has an output of 960 ch and the display panel has one source line for one pixel column, the source lines are driven by 12 source drivers for a 4K panel, and by 24 source drivers for an 8K panel. Each of the source drivers 13-1 to 13-*p* is formed on a semiconductor IC (integrated circuit) chip.

The source drivers 13-1 to 13-*p* generate gradation voltage signals Vd1 to Vdm based on the video data signal VD, the line start signal LS, and the clock signal CLK, and applies those signals to the source lines SL1 to SLm. Also, each of the source drivers 13-1 to 13-*p* has a function of detecting an error of the source driver, generating an error detection signal ERR indicating the detection result, and supplying the signal ERR to the display control unit 11.

Figure 2:
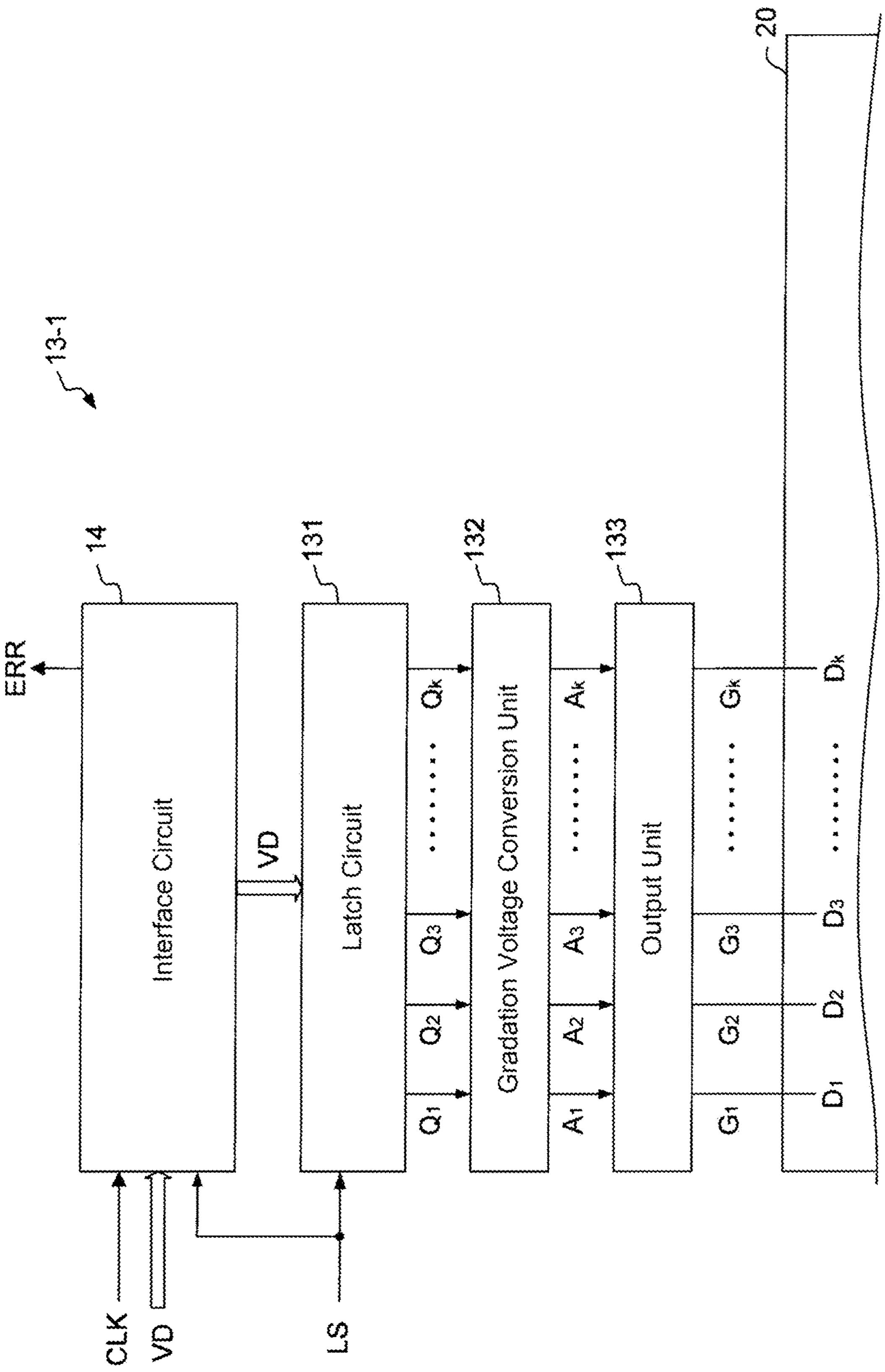
FIG. 2 is a block diagram illustrating an internal configuration of a source driver 13.

FIG. 2 is a block diagram illustrating the internal configuration of the source driver 13-1, one of the source drivers 13-1 to 13-*p*. The source driver 13-1 includes a latch circuit 131, a gradation voltage conversion unit 132, an output unit 133, and an interface circuit 14. The gradation voltage conversion unit may be an output circuit. The output unit may be an output circuit. The other source drivers 13-2 to 13-*p* have the same configuration.

The latch circuit 131 successively receives a series of pixel data pieces PD included in the video data signal VD supplied from the display control unit 11 through the interface circuit 14. Every time the latch circuit 131 receives as many pixel data pieces as the number of output ch (that is, the number obtained by dividing the pixel data pieces for one horizontal scanning line by the number of source drivers) in accordance with the line start signal LS, the latch circuit 131 supplies k-number of pixel data pieces PD to the gradation voltage conversion unit 132 as the pixel data Q1 to Qk.

The gradation voltage conversion unit 132 converts the respective pixel data pieces Q1 to Qk to gradation voltages A1 to Ak of the positive polarity and the negative polarity having voltage values corresponding to the luminance gradations represented by the respective pixel data pieces Q.

The output unit 133 generates a voltage by amplifying each of the gradation voltages A1 to Ak with a gain of 1 separately, and supplies those voltages to the source lines D1 to Dk of the displaying device 20 as the pixel driving voltages G1 to Gk.

The interface circuit 14 receives the video data signal VD, the clock signal CLK, and the line start signal LS from the display control unit 11, and supplies the video data signal VD to the latch circuit 131 at a timing defined by each signal. Also, the interface circuit 14 detects an error in the source driver 13, and outputs an error detection signal ERR indicating the detection result to the display control unit 11.

Figure 3:
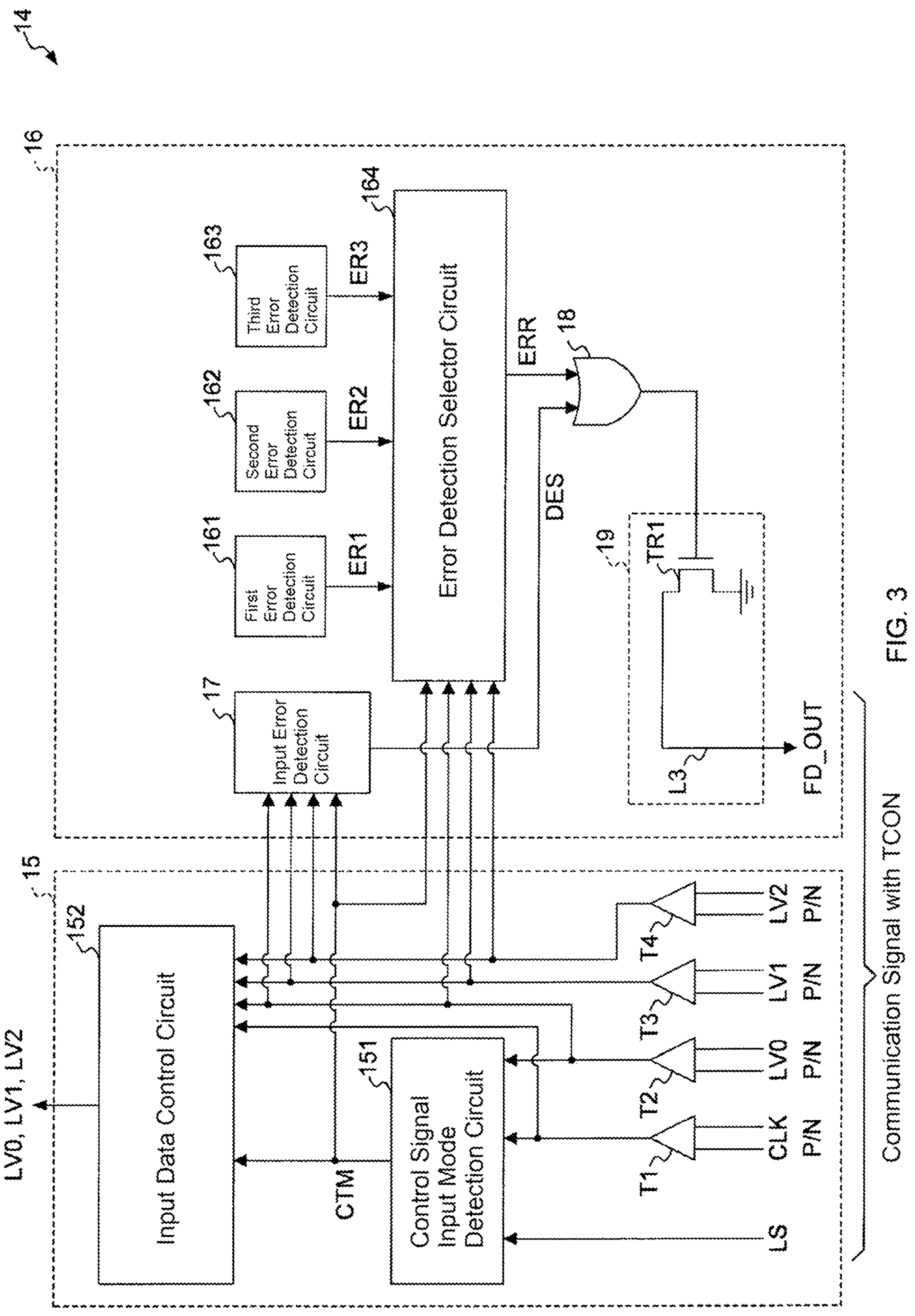
FIG. 3 is a block diagram illustrating a configuration of an interface circuit 14 of an embodiment of the present invention.

FIG. 3 is a block diagram illustrating a configuration of the interface circuit 14. The interface circuit 14 is constituted of a data control block 15 and an error detection block 16.

The data control block 15 has a control signal input mode detection circuit 151 and an input data control circuit 152. The data control block 15 also has input terminals T1, T2, T3, and T4, through which the clock signal CLK and the input data signals LV0 to LV2 are received. The input terminals T1, T2, T3, and T4 are respectively connected to the display control unit 11 by data signal lines (not shown in the figure).

The clock signal CLK inputted into the input terminal T1 is supplied to the control signal input mode detection circuit 151 and the input data control circuit 152. The input data signal LV0 inputted into the input terminal T2 is supplied to the control signal input mode detection circuit 151, the input data control circuit 152, and an error detection selector circuit 164 of the error detection block 16. The input data signals LV1 and LV2 inputted into the input terminals T3 and T4 are supplied to the input data control circuit 152 and the error detection selector circuit 164.

The control signal input mode detection circuit 151 receives the line start signal LS from the display control unit 11, and receives the clock signal CLK and the input data signal LV0 via the input terminals T1 and T2. The control signal input mode detection circuit 151 detects a data input mode period (data input period) in which the input data signals LV0, LV1 and LV2 are supplied to the latch circuit 131, and a control signal input mode period (data non-input period) in which the input data signals LV0, LV1, or LV2 are not supplied to the latch circuit 131, but control signals other than the input data signals are inputted, based on the line start signal LS, the clock signal CLK, and the input data signal LV0. For example, the control signal input mode detection circuit 151 detects a mode change where that the control signal input mode is switched to the data input mode after the signal level of the input data signal LV0 stays at the logical level 1 for two clock periods and then drops to the logical level 0 in the subsequent clock period (that is, when the signal level changes in the pattern of H→H→L over the three clock periods).

The control signal input mode detection circuit 151 generates a control mode signal CTM indicating whether the current mode is the control signal input mode or not based on the signal level, and supplies the control mode signal CTM to the input data control circuit 152 and the error detection selector circuit 164. The control mode signal CTM has a property of a timing signal that indicates a timing at which the input mode is switched between the control signal input mode and the data input mode based on signal level variations.

The input data control circuit 152 supplies the input data signals LV0, LV1 and LV2 to the latch circuit 131 during the data input mode period.

Also, the input data control circuit 152 is connected to an interface circuit of an adjacent source driver that is cascade-connected (cascade-connected source driver) via a signal line (not shown in the figure). The input data control circuit 152 transmits and receives a start pulse signal to/from the interface circuit provided in the adjacent source driver. The start pulse signal is a signal indicating a start of data input, and is used for each source driver to recognize an input timing of image data of mini-LVDS when the source drivers are cascade-connected.

Figure 4:
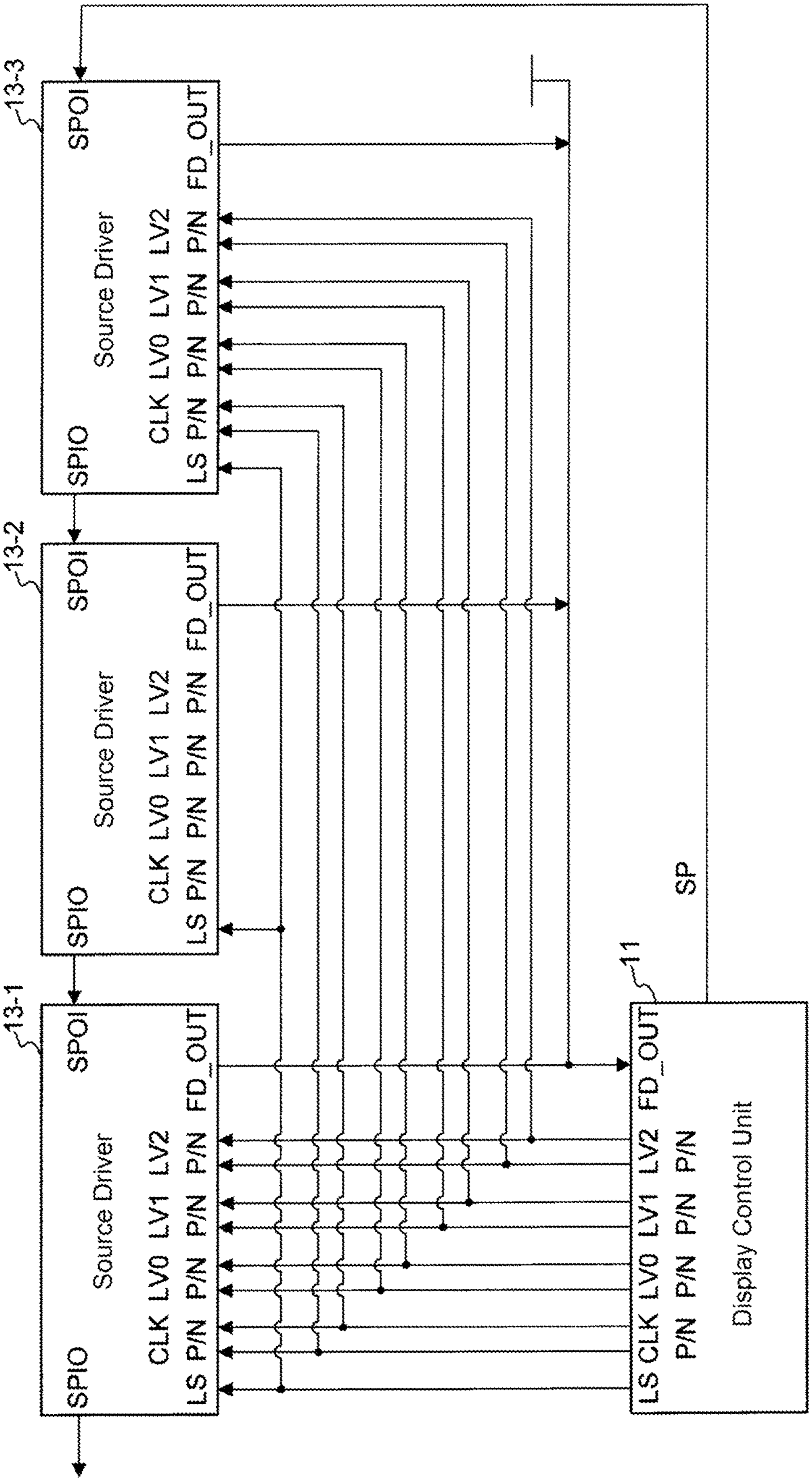
FIG. 4 is a block diagram illustrating a connection relationship between a plurality of source drivers and a display control unit.

FIG. 4 is a block diagram schematically illustrating a connection relationship between the display control unit 11 and a plurality of source drivers that are cascade-connected. Here, a case in which the number of source drivers is three (that is, p=3 in the block diagram of FIG. 1) is described as an example.

The line start signal LS, the clock signal CLK, and the input data signals LV0 to LV2 are respectively supplied to each of the source drivers 13-1, 13-2, and 13-3 from the display control unit 11. The start pulse signal SP outputted from the display control unit 11 is supplied to the source driver 13-3, and then supplied to the source driver 13-2, and the source driver 13-1 in this order.

Each of the source drivers 13-1 to 13-3 has an FD_OUT terminal that outputs the error detection signal ERR to the display control unit 11.

With reference to FIG. 3 again, the error detection block 16 has the first error detection circuit 161, the second error detection circuit 162, and the third error detection circuit (will be collectively referred to as the first to third error detection circuits 161 to 163) and the error detection selector circuit 164.

The first to third error detection circuits 161 to 163 detect errors such as abnormal temperatures, abnormal voltages and abnormal polarity inversion inside of the source driver 13. The first to third error detection circuits 161 to 163 respectively detect different types of errors. The first to third error detection circuits 161 to 163 supply detection result signals ER1 to ER3 indicating respective error detection results to the error detection selector circuit 164.

The error detection selector circuit 164 selects one of the first to third error detection circuits 161 to 163 at a different clock timing, based on the control mode signal CTM and the input data signals LV0, LV1, and LV2 supplied from the data control block 15, and outputs the detection result signal of the selected error detection circuit as the error detection signal ERR.

The error detection block 16 also has an input error detection circuit 17, an OR gate 18, and a signal output unit 19.

The input error detection circuit 17 is a detection circuit that detects an input error of the input data signals LV0, LV1 and LV2 in order to determine whether the data supply lines have an error such as line breaking or not. The input error detection circuit 17 determines whether there is a data input error (that is, whether or not the data supply lines have line breaking or the like) based on a prescribed pattern of change in signal level of each of the input data signals LV0, LV1, and LV2 during a period after the line start signal LS rises up and before the line start signal LS of the next line rises up and while the control mode signal CTM is at the H level.

In this embodiment, the input error detection circuit 17 determines that there is no data input error in the input data signals LV0, LV1, and LV2 if the pattern of "H→H→L" is detected as a change pattern of the signal level of each of the input data signals LV0, LV1 and LV2. On the other hand, the input error detection circuit 17 determines that there is a data input error in the input data signals LV0, LV1, and LV2 if the pattern of "H→H→L" is not detected as a change pattern of the signal level of each of the input data signals LV0, LV1, and LV2.

Figure 5:
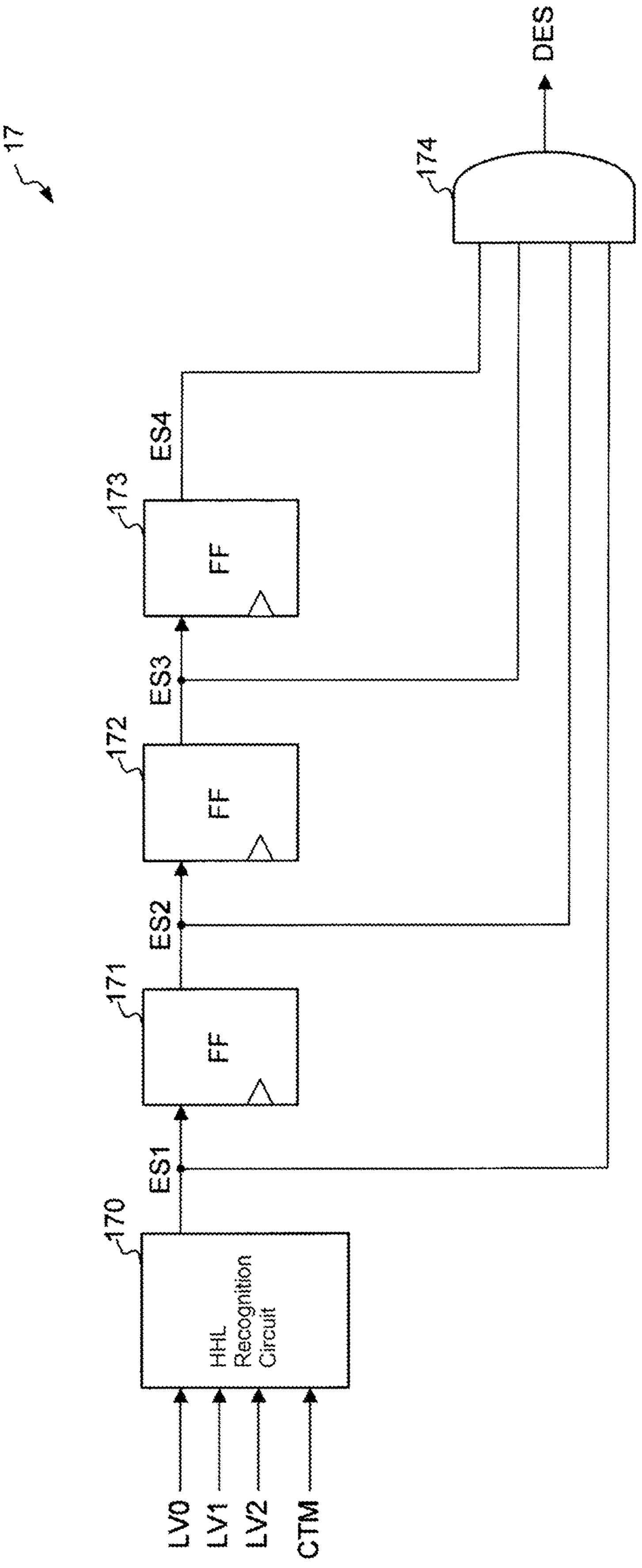
FIG. 5 is a block diagram illustrating a configuration of an input error detection circuit 17.

FIG. 5 is a block diagram illustrating a configuration of the input error detection circuit 17. The input error detection circuit 17 has an HHL recognition circuit 170, FF171, FF172, FF173, and an AND gate 174.

The HHL recognition circuit 170 outputs an L-level input error detection signal ES1 when detecting the pattern of "H→H→L" as a change pattern of the signal level of each of the input data signals LV0, LV1 and LV2 during a period in which the control mode signal CTM is at the H level. On the other hand, if such a change pattern is not detected, the HHL recognition circuit 170 outputs an H-level input error detection signal ES1.

FF171, 172, and 173 are flip-flop circuits. FF171 receives the input error detection signal ES1, holds the signal for a data period of one line, and outputs the signal as an input error detection signal ES2. FF172 receives the input error detection signal ES2, holds the signal for a data period of one line, and outputs the signal as an input error detection signal ES3. FF173 receives the input error detection signal ES3, holds the signal for a data period of one line, and outputs the signal as an input error detection signal ES4.

The AND gate 174 receives those input error detection signals ES1, ES2, ES3, and ES4, and outputs a logical conjunction of those signals as a data error detection signal DES. This way, a determination on whether a signal change pattern of the signal level of the input data signals LV0, LV1, and LV2 is "H→H→L" or not is performed for a data input period for four lines, and if the state where the input error detection signal is at the H level continues for four lines or longer, it is determined that there is a data input error.

With reference to FIG. 3 again, the OR gate 18 receives the data error detection signal DES outputted from the input error detection circuit 17, and the error detection signal ERR outputted from the error detection selector circuit 164, and outputs OR of those signals as an OR signal ORS.

The signal output unit 19 includes a transistor TR1 made of an N-channel MOS transistor of the first conductivity type, and a signal output line L3 connected to the drain terminal of the transistor TR1.

The source terminal of the transistor TR1 is grounded and connected to a prescribed potential (in this embodiment, the ground potential). The gate terminal of the transistor TR1 is connected to the output part of the OR gate 18. The drain terminal of the transistor TR1 is connected to the signal output line L3 that outputs the FD_OUT signal. That is, the drain terminal of the transistor TR1 constitutes an open drain terminal that outputs an FD_OUT signal (referred to as an FD_OUT terminal in the description below).

When an H-level signal is applied to the gate terminal of the transistor TR1, the transistor TR1 is turned on, and an L-level FD_OUT signal is outputted from the open drain terminal. On the other hand, when an L-level signal is applied to the gate terminal of the transistor TR1, the transistor TR1 is turned off, and an H-level FD_OUT signal is outputted from the open drain terminal.

Next, the operations of the data control block 15 and the error detection block 16 will be explained. First, an operation when there is no data input error (there is no error in the data supply lines such as line breaking) will be explained.

Figure 6:
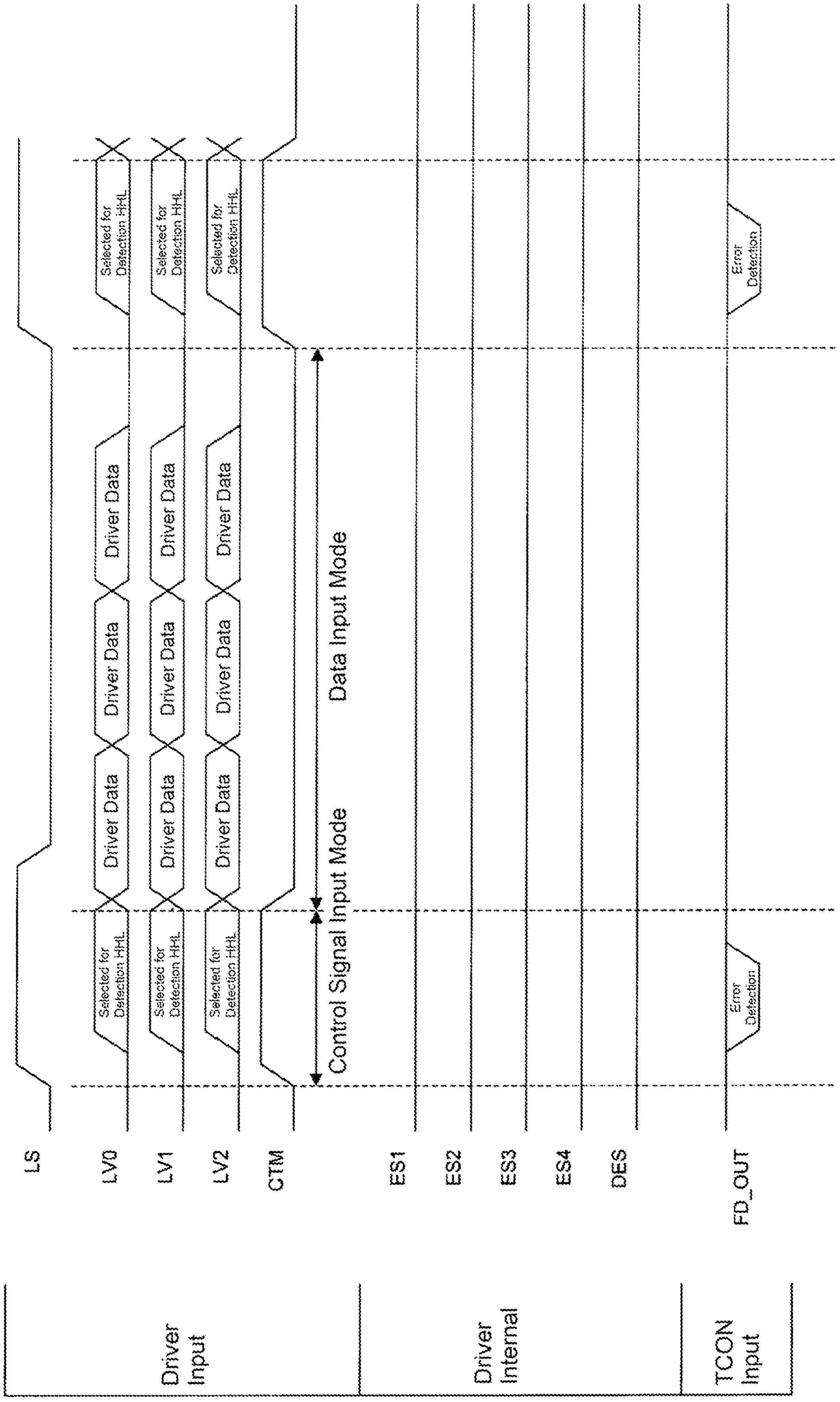
FIG. 6 is a time chart illustrating a signal change of each signal when there is no data input error.

FIG. 6 is a time chart illustrating a change in signal level of each of the signals when there is no data input error.

When the line start signal LS rises to the H level, the control signal input mode detection circuit 151 detects the control mode being on, and generates an H-level control mode signal CTM. The error detection selector circuit 164 selects the first to third error detection circuits 161 to 163 in this order in accordance with the combination of signal levels of the input data signals LV0, LV1, and LV2.

After monitoring all of the first to third error detection circuits 161 to 163, the display control unit 11 changes the signal level of the input data signals LV0, LV1, and LV2 in the pattern of "H→H→L".

If there is no data input error, the HHL recognition circuit 170 of the input error detection circuit 17 recognizes the change pattern of "H→H→L" of the input data signals LV0, LV1, and LV2, and outputs an L-level input error detection signal ES1 indicating that there is no data input error. FF171, FF172 and FF173 respectively output L-level input error detection signals ES2, ES3, and ES4. Based on those signals, the input error detection circuit 17 outputs an L-level data error detection signal DES.

Because the L-level data error detection signal DES is supplied to the gate of the transistor TR1 of the signal output unit 19, the transistor TR1 stays off. As a result, the signal output unit 19 outputs the H-level FD_OUT signal. The display control unit 11 receives the H-level FD_OUT signal, and determines that there is no error in the data supply lines of the input data signals LV0 to LV2.

Next, an operation when there is a data input error (there is an error in the data supply lines such as line breaking) will be explained with reference to the time charts of FIGS. 7 and 8.

In the control signal input mode, after monitoring all of the first to third error detection circuits 161 to 163, the display control unit 11 changes the signal level of the input data signals LV0, LV1, and LV2 in the pattern of "H→H→L".

At this time, if there is an error in the data supply line of the input data signal LV2 such as line breaking, the input data signal LV2 is fixed to the L level. Thus, the HHL recognition circuit 170 of the input error detection circuit 17 cannot recognize the change pattern of "H→H→L" of the input data signal LV2. As a result, the HHL recognition circuit 170 outputs the H-level input error detection signal ES1.

Figure 7:
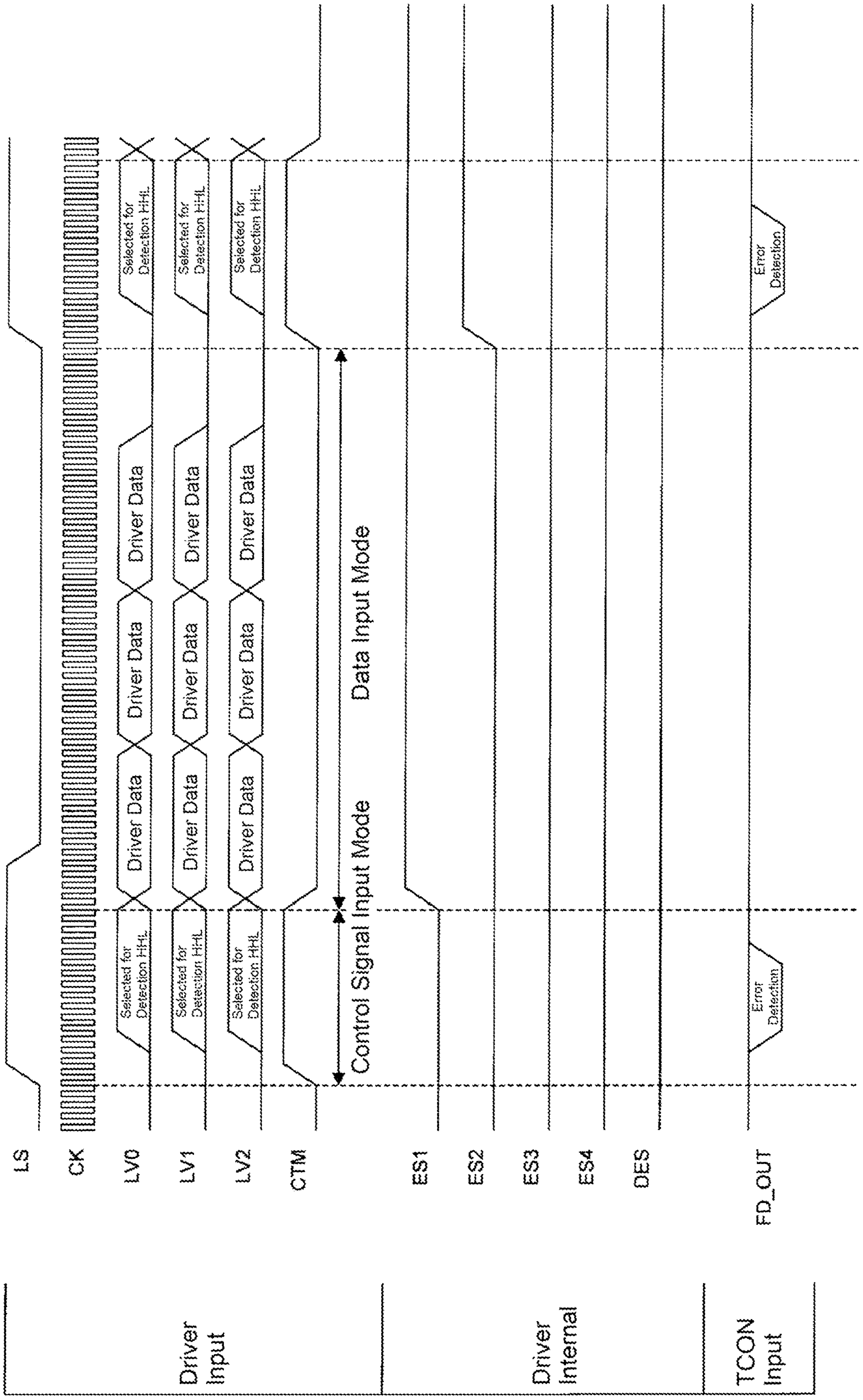
FIG. 7 is a time chart illustrating a signal change of each signal when there is a data input error.
Figure 8:
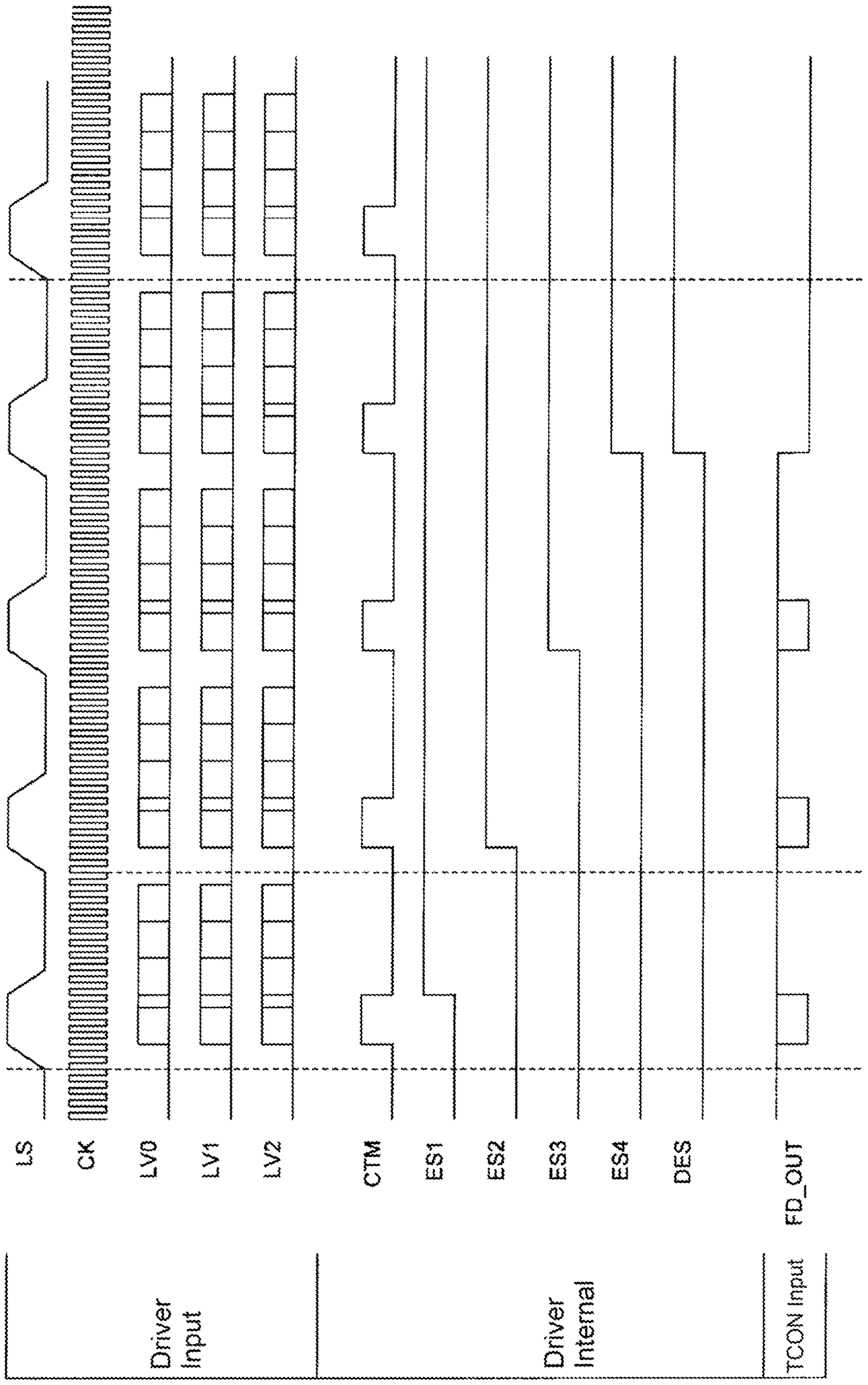
FIG. 8 is a time chart illustrating a signal change of each signal when there is a data input error.

As illustrated in FIG. 7, in the same data input mode period, the input error detection signal ES1 is changed to the H level, but the input error detection signals ES2, ES3, and ES4 are all kept at the L level. The input error detection signal ES2 is changed to the H level at the same time as the control mode signal CTM rising up again.

For the data of the next line, the HHL recognition circuit 170 detects the signal level of the input data signals LV0, LV1, and LV2. Because the HHL recognition circuit 170 of the input error detection circuit 17 cannot recognize the change pattern of "H→H→L" of the input data signal LV2, the signal level of the input error detection signal ES1 is maintained at the H level. The signal level of the input error detection signal ES2 is at the H level.

In the same manner, for the data of the third line and the data of the fourth line, the HHL recognition circuit 170 detects the signal level of the input data signals LV0, LV1, and LV2, and outputs the H-level input error detection signal ES1. With the operation of FFs 171 to 173, the input error detection signals ES3 and ES4 are changed to the H level successively in response to the control mode signal CTM rising up.

Because the data input error was detected for the data of four lines, the input error detection circuit 17 outputs the H-level data error detection signal DES.

The H-level data error detection signal DES is supplied to the gate of the transistor TR1 of the signal output unit 19, which turns the transistor TR1 on, and as a result, the drain terminal of the transistor TR1 outputs the L-level FD_OUT signal. The display control unit 11 receives the L-level FD_OUT signal, and determines that there is an error in one of the data supply lines of the input data signals LV0 to LV2.

As described above, the interface circuit 14 changes the signal level of the FD_OUT signal, which is the output signal of the signal output unit 19, to the L level when detecting a data input error of the input data signals LV0 to LV2. The display control unit 11 recognizes the FD_OUT signal that has been forcibly lowered to the L level, and detects an error in the data supply lines.

Thus, according to the interface circuit 14 of this embodiment, it is possible to detect line breaking in one of the data supply lines that connect the display control unit 11 and the respective cascade-connected source drivers.

Figure 9:
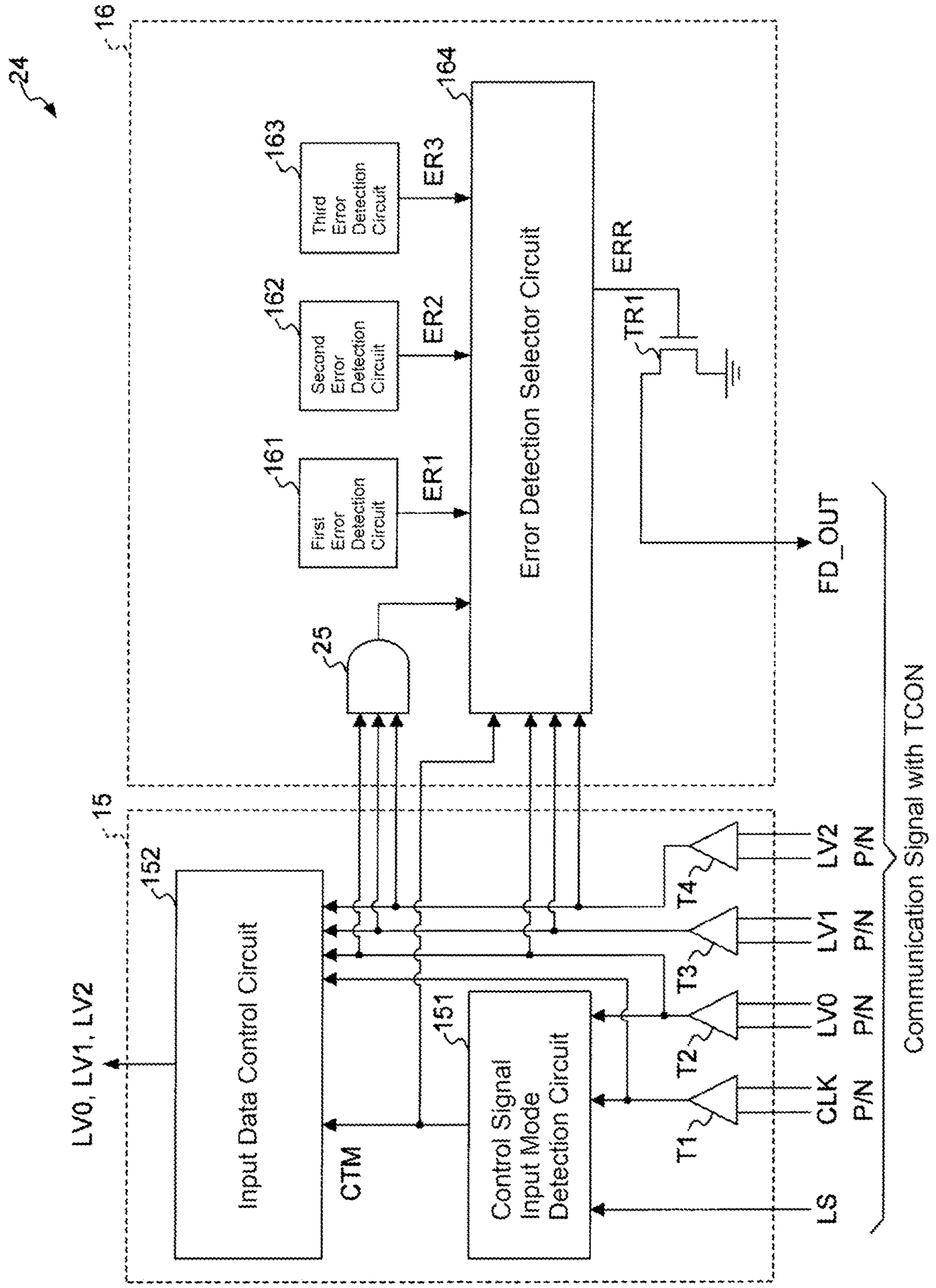
FIG. 9 is a block diagram illustrating a configuration of an interface circuit of a comparison example.

FIG. 9 is a block diagram illustrating a configuration of an interface circuit 24 of a comparison example in which a configuration equivalent to the input error detection circuit 17 is not provided, unlike the interface circuit 14 of this embodiment. The interface circuit 24 of the comparison example has an AND gate 25 that outputs a logical conjunction of the input data signals LV0, LV1, and LV2.

Figure 10:
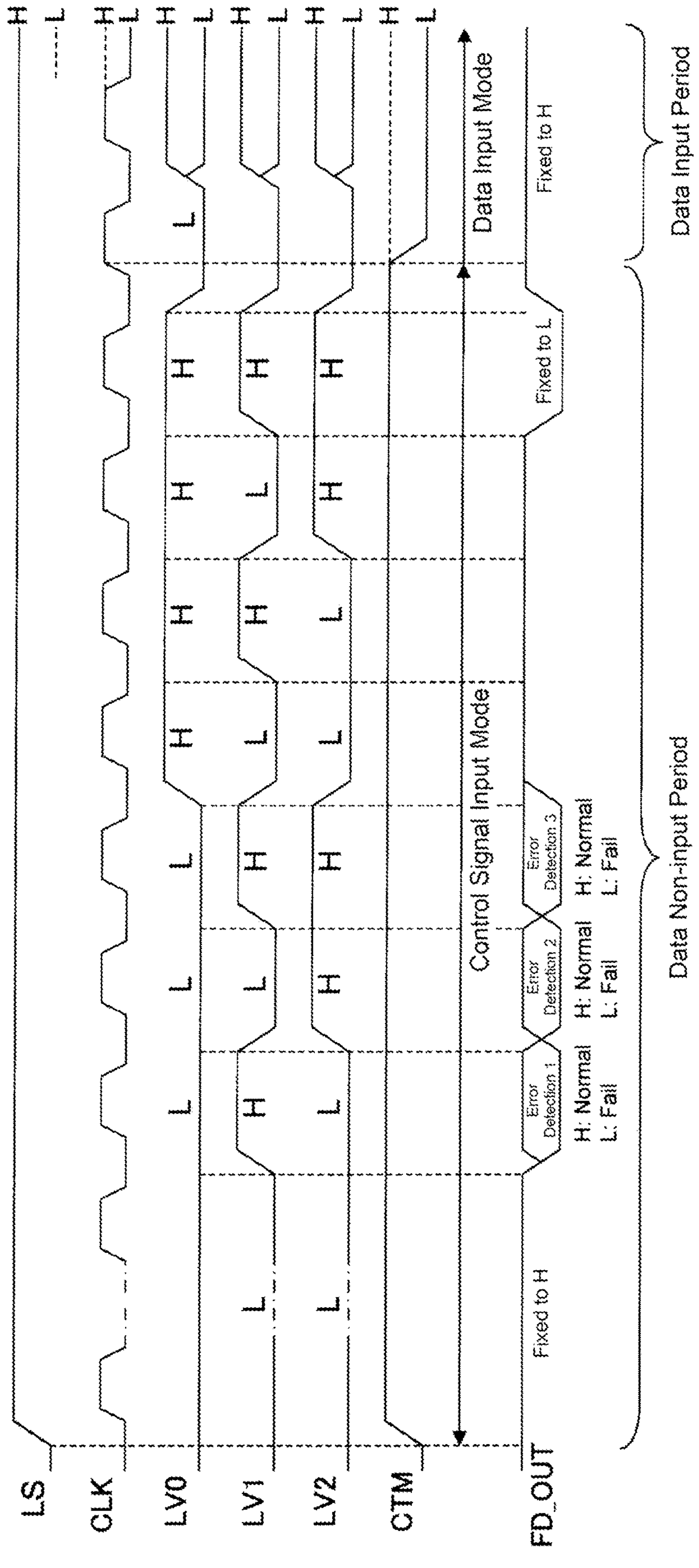
FIG. 10 is a time chart illustrating a signal change of each signal in the comparison example.

FIG. 10 is a time chart illustrating a change in signal level of each signal in the interface circuit 24 of the comparison example. In the configuration of the comparison example, the display control unit 11 raises the signal level of the input data signals LV0, LV1, and LV2 of the display control unit 11 to the H level in order to detect line breaking or the like of the data supply lines of the input data signals LV0, LV1, and LV2. When there is no data input error in the input data signals LV0, LV1, and LV2, the L-level FD_OUT signal is outputted. If the signal level of the FD_OUT signal is at the L level, then the display control unit 11 determines that there is no data input error, and if the signal level is not at the L level, then the display control unit 11 determines that there is data input error.

However, with the configuration of the comparison example, if a plurality of source drivers are cascade-connected, even if one of the source drivers (the source driver 13-3 of FIG. 4, for example) has an error such as line breaking, because other source drivers (the source drivers 13-1 and 13-2 in FIG. 4, for example) output the L-level FD_OUT signal, the display control unit 11 erroneously determines that there is no line breaking in the data supply lines of any of the source drivers.

On the other hand, according to the interface circuit 14 of this embodiment, each of the plurality of source drivers has the input error detection circuit 17, and when there is data input error, the signal level of the FD_OUT signal is forcibly lowered to the L level. Thus, by checking the signal level of the FD_OUT signal, the display control unit 11 can determine whether line breaking or the like has occurred in the data supply line of any of the source drivers 13-1 to 13-3.

The present invention is not limited to the embodiment described above. For example, in the embodiment above, an example in which three source drivers were provided was explained, but the number of source drivers is not limited to this. The number of error detection circuits is not limited to the number described in the embodiment above.

The combination of the signal levels (H and L) of each signal may be modified as necessary. For example, in the embodiment above, an example in which the signal level of the input data signals LV0, LV1, and LV2 is changed in the pattern of "H→H→L" was described, but it is also possible to employ a configuration in which the signal level is changed in a different pattern, and a data input error is detected based on this change pattern of the signal level.

DESCRIPTIONS OF REFERENCE CHARACTERS

11 Display Control Unit
12 Gate Driver
13 Source Driver
14 Interface Circuit
15 Data Control Block
16 Error Detection Block
17 Input Error Detection Circuit
18 OR Gate
19 Signal Output Unit
20 Displaying Device
100 Display Device
131 Latch Circuit
132 Gradation Voltage Conversion Unit
133 Output Unit
151 Control Signal Input Mode Detection Circuit
152 Input Data Control Circuit
161 to 163 Error Detection Circuit
164 Error Detection Selector Circuit

What is claimed is:

1. A source driver that drives a display device based on a plurality of data signals, comprising:

an interface circuit that receives a clock signal and the plurality of data signals and that outputs the plurality of data signals in accordance with a clock timing of the clock signal;

a latch circuit that receives the plurality of data signals outputted from the interface circuit and that outputs the plurality of data signals in a successive order corresponding to pixel columns of the display device in a scanning line direction;

a gradation voltage conversion circuit that converts the plurality of data signals outputted from the latch circuit to gradation voltages corresponding to luminance gradations represented by the plurality of data signals outputted from the latch circuit; and an output circuit that separately amplifies each of the gradation voltages and outputs the amplified gradation voltages as driving signals of the display device, wherein the interface circuit comprises:

a timing signal generating circuit that receives the clock signal and that generates a timing signal indicating a timing to switch between a data input period in which the plurality of data signals are supplied to a data latch circuit and a non-input period in which the supply of the plurality of data signals is stopped, based on at least one of the plurality of data signals and the clock signal;

a data control circuit that controls the supply of the plurality of data signals to the data latch circuit based on the timing signal;

a plurality of driver error detection circuits that detect an error in the source driver;

a selector circuit that selects one of the plurality of driver error detection circuits based on the plurality of data signals during the non-input period, and outputs a driver error detection signal indicating a detection result of the selected driver error detection circuit at a timing corresponding to the timing signal and the clock signal;

an input error detection circuit that detects an error in data input of the plurality of data signals and outputs an input error detection signal indicating a detection result;

an OR circuit that outputs an OR signal indicating a logical disjunction of the driver error detection signal and the input error detection signal; and a signal output unit that includes a first conductivity-type MOS transistor having a gate terminal connected to an output part of the OR circuit and a source terminal connected to a prescribed potential, and a signal output line connected to a drain terminal of the MOS transistor.

2. A display device, comprising:

a display panel having a plurality of data lines and a plurality of scanning lines, and pixel switches and pixel units disposed at respective intersections of the plurality of data lines and the plurality of scanning lines;

a display control unit that outputs a clock signal and a plurality of data signals; and a plurality of source drivers that are arranged along an extending direction of the plurality of scanning lines and that each drive the display device based on the plurality of data signals, wherein each of the plurality of source drivers comprises:

an interface circuit that receives the clock signal and the plurality of data signals and that outputs the plurality of data signals in accordance with a clock timing of the clock signal;

a latch circuit that receives the plurality of data signals outputted from the interface circuit and that outputs the data signals in a successive order corresponding to pixel columns of the display device in a scanning line direction;

a gradation voltage conversion circuit that converts the plurality of data signals outputted from the latch circuit to gradation voltages corresponding to luminance gradations represented by the plurality of data signals outputted from the latch circuit; and an output circuit that separately amplifies each of the gradation voltages and outputs the amplified gradation voltages as driving signals of the display device, wherein the interface circuit comprises:

a timing signal generating circuit that receives the clock signal and that generates a timing signal indicating a timing to switch between a data input period in which the plurality of data signals are supplied to a data latch circuit and a non-input period in which the supply of the plurality of data signals is stopped, based on at least one of the plurality of data signals and the clock signal;

a data control circuit that controls the supply of the plurality of data signals to the data latch circuit based on the timing signal;

a plurality of driver error detection circuits that detect an error in the source driver;

a selector circuit that selects one of the plurality of driver error detection circuits based on the plurality of data signals during the non-input period, and outputs a driver error detection signal indicating a detection result of the selected driver error detection circuit at a timing corresponding to the timing signal and the clock signal;

an input error detection circuit that detects an error in data input of the plurality of data signals and outputs an input error detection signal indicating a detection result;

an OR circuit that outputs an OR signal indicating a logical disjunction of the driver error detection signal and the input error detection signal; and a signal output unit that includes a first conductivity-type MOS transistor having a gate terminal connected to an output part of the OR circuit and a source terminal connected to a prescribed potential, and a signal output line connected to a drain terminal of the MOS transistor.

* * * * *